(12) United States Patent
Bannur et al.

(10) Patent No.: US 11,074,293 B2
(45) Date of Patent: Jul. 27, 2021

(54) GENERATING PROBABILISTIC TRANSITION DATA

(71) Applicant: Microsoft Technology Licensing, LLC, Redmond, WA (US)

(72) Inventors: Sushma Bannur, Cupertino, CA (US); Omar Alonso, Redwood Shores, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 14/258,308

(22) Filed: Apr. 22, 2014

(65) Prior Publication Data

US 2015/0302112 A1 Oct. 22, 2015

(51) Int. Cl.
*G06F 16/901* (2019.01)
*G06F 7/24* (2006.01)
*G06N 7/00* (2006.01)
*G06F 16/29* (2019.01)
*G06Q 10/10* (2012.01)
*G06Q 50/00* (2012.01)
*G06Q 30/02* (2012.01)

(52) U.S. Cl.
CPC ............ *G06F 16/9024* (2019.01); *G06F 7/24* (2013.01); *G06F 16/29* (2019.01); *G06N 7/005* (2013.01); *G06Q 10/10* (2013.01); *G06Q 50/01* (2013.01); *G06Q 30/0205* (2013.01); *G06Q 30/0261* (2013.01)

(58) Field of Classification Search
None
See application file for complete search history.

(56) References Cited

U.S. PATENT DOCUMENTS 6,321,158 B1 * 11/2001 DeLorme ............... G01C 21/26
340/995.16
7,565,157 B1 7/2009 Ortega et al.
8,463,295 B1 6/2013 Caralis et al.
(Continued)

FOREIGN PATENT DOCUMENTS

WO 2009088529 A1 7/2009
WO 2013134171 A1 9/2013

OTHER PUBLICATIONS

"International Search Report & Written Opinion Received for PCT Patent Application No. PCT/US2015/024597", dated Jul. 6, 2015, 10 Pages.
(Continued)

*Primary Examiner* — Uyen T Le
(74) *Attorney, Agent, or Firm* — Ray Quinney & Nebeker P.C.; Paul N. Taylor

(57) ABSTRACT

Systems and methods are presented for generating a transition graph from check-in data for determining probabilistic transitions of a user from an origin (location) to a destination. Check-in data for a plurality of users is obtained. The check-in data is organized and analyzed to determine a set of transition tuples for each of the plurality of users. These transition tuples are aggregated and used to generate a transition graph comprising a plurality of nodes and edges. Each node corresponds to a location and each edge indicates a transition from an origin node to a destination node and is associated with a likelihood of a user transitioning from the origin node to the destination node.

19 Claims, 11 Drawing Sheets

(56) References Cited

U.S. PATENT DOCUMENTS

| | | | |
|---|---|---|---|
| 8,554,670 | B1 | 10/2013 | Blank et al. |
| 9,122,757 | B1* | 9/2015 | Wernick ............ G06F 17/30867 |
| 2003/0065805 | A1 | 4/2003 | Barnes, Jr. |
| 2005/0251406 | A1 | 11/2005 | Bolt et al. |
| 2008/0005071 | A1 | 1/2008 | Flake et al. |
| 2008/0023542 | A1* | 1/2008 | Kamat ................. G06Q 30/02 235/380 |
| 2009/0005021 | A1 | 1/2009 | Forstall et al. |
| 2009/0222438 | A1 | 9/2009 | Standen et al. |
| 2009/0228474 | A1* | 9/2009 | Chiu ................ G06F 17/30516 |
| 2009/0265307 | A1 | 10/2009 | Reisman et al. |
| 2010/0120450 | A1 | 5/2010 | Herz |
| 2010/0190510 | A1 | 7/2010 | Maranhas et al. |
| 2010/0312644 | A1 | 12/2010 | Borgs et al. |
| 2011/0184760 | A1 | 7/2011 | Shen |
| 2011/0246442 | A1 | 10/2011 | Bartell |
| 2011/0276565 | A1 | 11/2011 | Zheng et al. |
| 2011/0282798 | A1 | 11/2011 | Zheng et al. |
| 2012/0001919 | A1 | 1/2012 | Lumer |
| 2012/0089621 | A1 | 4/2012 | Liu et al. |
| 2012/0185793 | A1* | 7/2012 | Binsztok ............... G06Q 10/02 715/772 |
| 2012/0203832 | A1 | 8/2012 | Vastardis et al. |
| 2012/0233158 | A1 | 9/2012 | Braginsky et al. |
| 2013/0103758 | A1 | 4/2013 | Alison et al. |
| 2013/0246323 | A1 | 9/2013 | Athas |
| 2013/0275429 | A1 | 10/2013 | York et al. |
| 2013/0332460 | A1 | 12/2013 | Pappas et al. |
| 2014/0032452 | A1 | 1/2014 | Perkowitz et al. |
| 2014/0032453 | A1 | 1/2014 | Eustice et al. |
| 2014/0089422 | A1 | 3/2014 | Attalla et al. |
| 2014/0201173 | A1 | 7/2014 | Roth et al. |
| 2014/0222912 | A1* | 8/2014 | St. Clair ................. H04L 67/22 709/204 |
| 2014/0278086 | A1* | 9/2014 | San Filippo ....... G01C 21/3423 701/527 |
| 2015/0276410 | A1* | 10/2015 | Lamoriniere .......... G01C 21/00 701/400 |
| 2015/0293964 | A1* | 10/2015 | Morfonios .............. H04L 43/04 707/753 |
| 2015/0304437 | A1* | 10/2015 | Vaccari ................. G06F 1/3215 709/204 |
| 2016/0203225 | A1 | 7/2016 | Alonso et al. |
| 2016/0239502 | A1 | 8/2016 | Alonso et al. |
| 2016/0360379 | A1 | 12/2016 | Cherry et al. |

OTHER PUBLICATIONS

"Second Written Opinion Issued in PCT Application No. PCT/US2015/024597", dated May 6, 2016, 6 Pages.

"International Preliminary Report on Patentability Issued in PCT Application No. PCT/US2015/024597", ddated Jul. 7, 2016, 7 Pages.

"What are the best things to do in downtown Las Vegas?", Retrieved From: http://www.quora.com/Las-Vegas/What-are-the-best-things-to-do-in-downtown-Las-Vegas, Oct. 6, 2014, 5 Pages.

"What are unusual, fun things to do in San Francisco?", Retrieved From: http://www.quora.com/What-are-unusual-fun-things-to-do-in-San-Francisco, Oct. 6, 2014, 16 Pages.

"Final Office Action Issued in U.S. Appl. No. 14/594,154", dated Oct. 19, 2017, 11 Pages.

"Non Final Office Action Issued in U.S. Appl. No. 14/594,154", dated May 3, 2018, 11 Pages.

"Non Final Office Action Issued in U.S. Appl. No. 14/594,154", dated Feb. 10, 2017, 13 Pages.

"Final Office Action Issued in U.S. Appl. No. 14/621,211", dated Dec. 7, 2017, 40 Pages.

"Non Final Office Action Issued in U.S. Appl. No. 14/621,211", dated May 24, 2017, 34 Pages.

Anagnostopoulos, et al., "Socio-Semantic Query Expansion using Twitter Hashtags", In Proceedings of Seventh International Workshop on Semantic and Social Media Adaptation and Personalization, Dec. 3, 2012, 6 Pages.

Baeza-Yates, et al., "Query Recommendation using Query Logs in Search Engines", In Proceedings of the International conference on Current Trends in Database Technology, Mar. 14, 2004, 10 Pages.

Becker, et al., "Automatic Identification and Presentation of Twitter Content for Planned Events", In Proceedings of the Fifth International Conference on Weblogs and Social Media, Jul. 17, 2011, 2 Pages.

Becker, Hila, "Identification and Characterization of Events in Social Media", Submitted in Partial Fulfillment of the Degree of Doctor of Philosophy in the Graduate School of Arts and Sciences, Jan. 2011, 193 Pages.

Becker, et al., "Identifying Content for Planned Events across Social Media Sites", In Proceedings of the Fifth International Conference on Web Search and Web Data Mining, Feb. 8, 2012, 10 Pages.

Chua, et al., "Automatic Summarization of Events from Social Media", In Proceedings of Seventh International AAAI conference on Weblogs and Social Media, Jul. 8, 2013, 11 Pages.

Imran, et al., "Practical Extraction of Disaster-Relevant Information from Social Media", In Proceedings of the 22nd International Conference on World Wide Web, May 13, 2013, 4 Pages.

Landwehr, et al., "Social Media in Disaster Relief", In Proceedings of Studies in Big Data, Sep. 25, 2014, 33 Pages.

Lin, et al., "Extracting Social Events for Learning Better Information Diffusion Models", In Proceedings of the 19th ACM SIGKDD International Conference on Knowledge Discovery and Data Mining, Aug. 11, 2013, 9 Pages.

"International Preliminary Report on Patentability Issued in PCT Application No. PCT/US2016/012400", dated Mar. 22, 2017, 7 Pages.

"International Search Report and Written Opinion Issued in PCT Application No. PCT/US2016/012400", dated Apr. 7, 2016, 09 Pages.

"Second Written Opinion Issued in PCT Application No. PCT/US2016/012400", dated Dec. 8, 2016, 6 Pages.

"International Preliminary Report on Patentability Issued in PCT Application No. PCT/US2016/016237", dated Apr. 20, 2017, 7 Pages.

"International Search Report and Written Opinion Issued in PCT Application No. PCT/US2016/016237", dated Apr. 22, 2016, 10 Pages.

"Second Written Opinion Issued in PCT Application No. PCT/US2016/016237", dated Dec. 21, 2016, 6 Pages.

Popescu, et al., "Extracting Events and Event Descriptions from Twitter", In Proceedings of the 20th International Conference Companion on World Wide Web, Mar. 28, 2011, 2 Pages.

Rowe, et al., "Aligning Tweets with Events: Automation via Semantics", In Journal Semantic Web, vol. 3, Issue 2, Apr. 2012, 16 Pages.

Wu, Neal, "San Francisco: What are the Best Things to do in San Francisco When it's Raining and Cold?", Retrieved From: http://www.quora.com/San-Francisco/What-are-the-best-things-to-do-in-San-Francisco-when-its-raining-and-cold, Dec. 26, 2012, 6 Pages.

Zhang, et al., "Mining Search Engine Query Logs for Query Recommendation", In Proceedings of the 15th International Conference on World Wide Web, May 23, 2006, 4 Pages.

Zheng, et al., "Collaborative Location and Activity Recommendations with GPS History Data", In Proceedings of the 19th International Conference on World Wide Web, Jan. 2010, pp. 1029-1038.

"Non Final Office Action Issued in U.S. Appl. No. 14/621,211", dated Aug. 10, 2018, 45 Pages.

* cited by examiner

GENERATING PROBABILISTIC TRANSITION DATA

BACKGROUND

One of the advantages of the popularity of various social networking services is that a substantial amount of data is generated. While much of this data is likely personal or private information, when appropriate restrictions and restraints are applied, the data represents a wealth of general information about people.

One aspect of social networking data is "check-in" data. While aspects of the check-in data gathered by each social networking site may (and likely will) vary between social networking sites, at a fundamental level the check-in data gathered by each of the social networking sites includes a user identifier, a location, a date, and a time, i.e., a particular user (of a social networking site) is at a specific location on a particular date at a specific time. Based on this information, the check-in data of one or more social networking sites may be evaluated (as a whole) to understand behavioral patterns of a population of users.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods are presented for generating a transition graph from check-in data for determining probabilistic transitions of a user from an origin (location) to a destination. Check-in data for a plurality of users is obtained. The check-in data is organized and analyzed to determine a set of transition tuples for each of the plurality of users. These transition tuples are aggregated and user to generate a transition graph comprising a plurality of nodes and edges. Each node corresponds to a location and each edge indicates a transition from an origin node to a destination node and is associated with a likelihood of a user transitioning from the origin node to the destination node.

According to additional aspects of the disclosed subject matter, a method for generating a transition graph for determining probabilistic transitions is presented. Check-in data of a plurality of users is obtained. Each item of check-in data indicates at least the presence of a corresponding user at a location. The check-in data is sorted according to the corresponding users and a set of transition tuples is determined for each of the plurality of users according to the sorted check-in data. The transition tuples are aggregated according to the origin of the transition tuples and a transition graph is generated according to the aggregated transition tuples. The transition graph comprises a plurality of nodes and edges where each node corresponds to a location and each edge indicates a transition from an origin node to a destination node and is associated with a likelihood of a user transitioning from the origin node to the destination node.

According to additional aspects of the disclosed subject matter, a computer system for generating a transition graph for determining probabilistic transitions is presented. The computer system comprises a processor and a memory, and the processor executes instructions stored in the memory as part of or in conjunction with additional components, including a data access component and a transition graph generator. The data access component configured to access check-in data for a plurality of users. The transition graph generator is configured to: determine a set of transition tuples for each of the plurality of users; aggregate the transition tuples according to the origin of each of the transition tuples; and generate a transition graph according to the aggregated transition tuples. The generated transition graph comprises a plurality of nodes and edges, each node corresponding to a location and each edge indicating a transition from an origin node to a destination node and associated with a likelihood of a user transitioning from the origin node to the destination node.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity, the term "exemplary" in this document should be interpreted as serving as an illustration or example of something, and it should not be interpreted as an ideal and/or a leading illustration of that thing.

As suggested above, while specific elements and/or aspects of the check-in data obtained from disparate sources can (and likely will) vary between sources, for purposes of this document the term "check-in data" should be interpreted as including at least a location, a date, and a time corresponding to a user.

Figure 1:
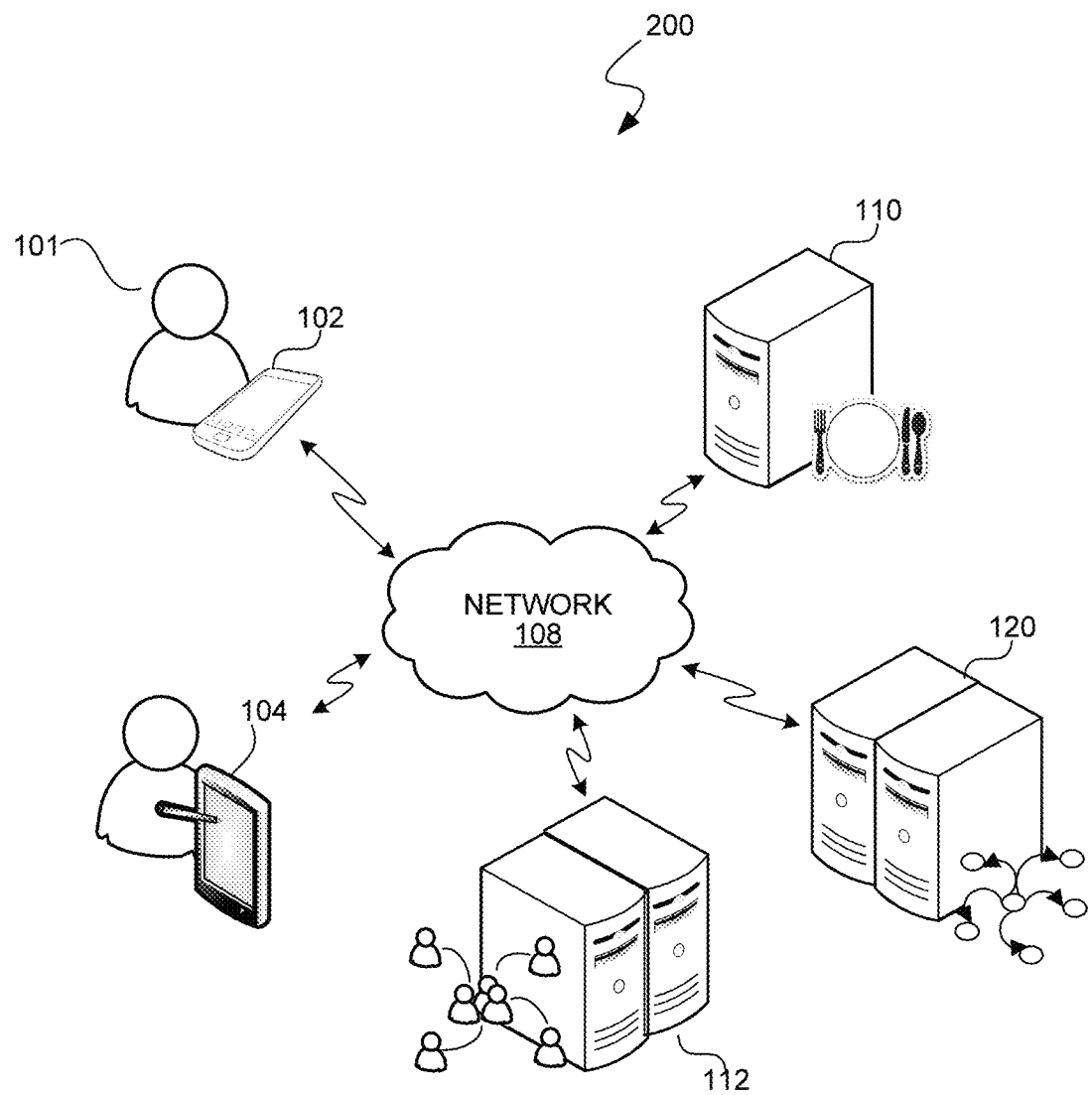
FIG. 1 is a pictorial diagram illustrating an exemplary network environment suitable for implementing aspects of the disclosed subject matter.

Turning now to the figures, FIG. 1 is a pictorial diagram illustrating an exemplary network environment 100 suitable for implementing aspects of the disclosed subject matter. In particular, the exemplary network environment 100 is suitable for generating a transition graph that includes information for providing probabilistic transition information for a user from an origin to a destination. The network environment 100 includes various user computer devices connected to a network 108, such as user computer devices 102-104. Each of the user computer devices, such as user computer device 102, may be configured to generate check-in data corresponding to a user, such as user 101, and provide the check-in data to one or more networked services over the computer network 108. As will be readily appreciated, user computer devices may include by way of illustration and not limitation: tablet computing devices, such as tablet computing device 104; smart phone devices such as smart phone 102; so-called "phablet" computing devices (i.e., computing devices that straddle the functionality of typical tablet computing devices and smart phone devices); laptop computers; wearable computing devices; personal digital assistants, and the like. Users may further generate check-in data by way of desktop computing devices (not shown), though the check-in data from these devices is typically user generated rather automatically generated check-in data. In contrast, check-in data from mobile devices may be automatically generated, though check-in data may also be manually/explicitly generated on the mobile devices.

The network environment 100 also includes network services, such as network services 110 and 112 that receive check-in data from the various user computer devices connected to the network 108. Examples of network services that receive check-in data include, by way of illustration and not limitation: Yelp®, FourSquare®, Facebook®, Bing® and the like. As will readily be appreciated by those skilled in the art, check-in data is typically (though not exclusively) generated by one or more apps and/or applications operating on a user's computer device (such as user computer devices 102 and 104) and transmitted to the corresponding network service.

Also included in the network environment 100 is a transition service 120 for generating a transition graph according to check-in data of a plurality of users. According to aspects of the disclosed subject matter, the transition service 120 may receive check-in data directly from a plurality of users (such as receiving check-in data from user computer devices as generated by corresponding apps/applications on the devices). Additionally or alternatively, the transition service 120 may obtain check-in data from other network services, such as network services 110 and 112, for generating a transition graph, as set forth below.

Figure 2:
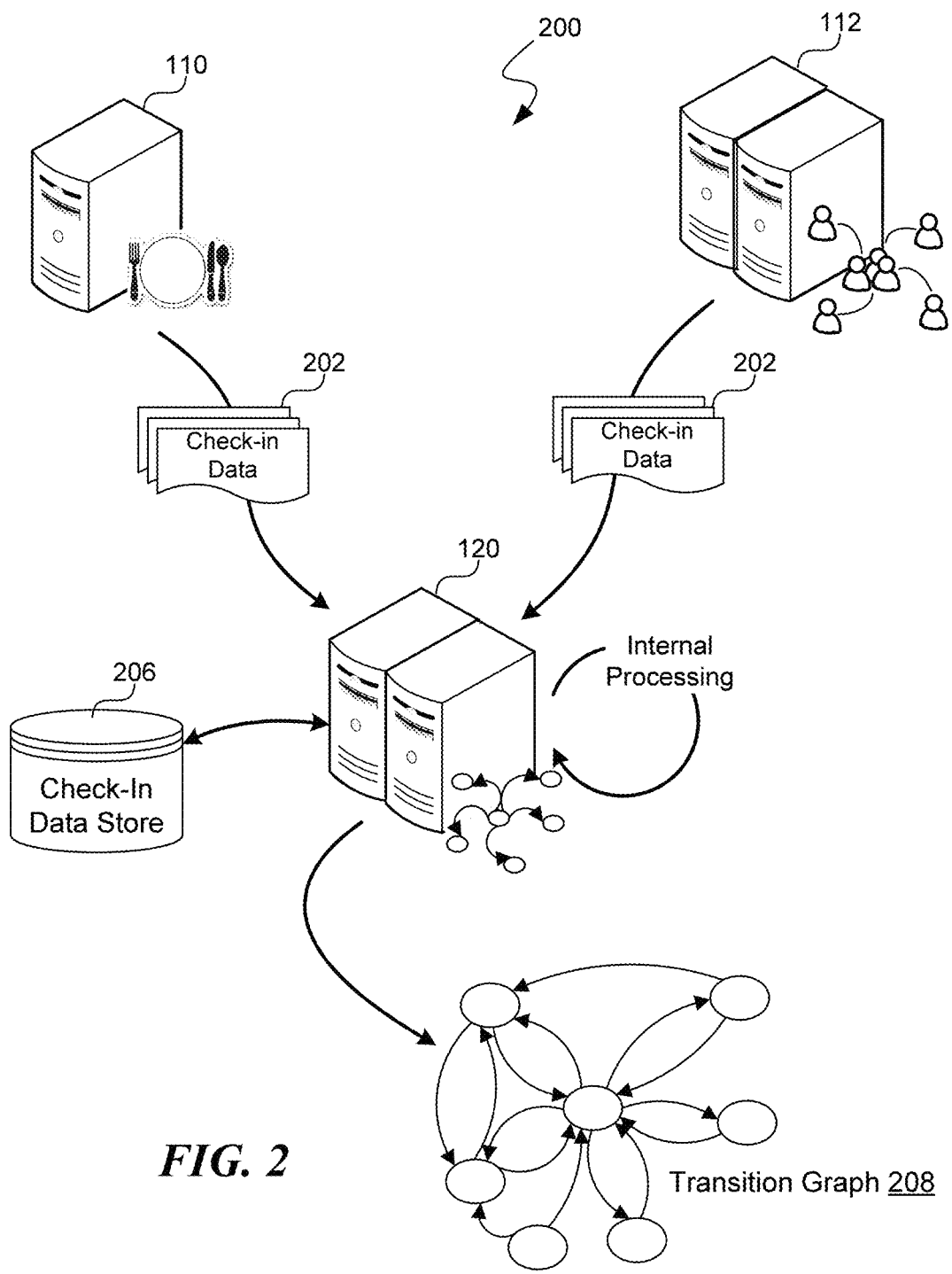
FIG. 2 is a pictorial diagram illustrating an exemplary flow of check-in data in generating a transition graph of probabilistic transition data.

To better illustrate the foregoing, FIG. 2 is a pictorial diagram illustrating an exemplary flow 200 of check-in data 202 in generating a transition graph 208 of probabilistic transition data. More particularly, the transition service 120 may obtain check-in data 202 from a plurality of sources, including third party sources such as network services 110 and 112, as well as from a data store 206 associated with the transition service. After internal processing of the check-in data (as will be described below), the transition service 120 generates a transition graph 208 that includes probabilistic transitions for a user from an origin to a destination.

A transition graph, as generated by a transition service 120, is comprised of nodes and edges, each node corresponding to a location, also referred to as an origin. A node/location may be a general location, e.g., Seattle, Yellowstone National Park, etc., or may correspond to a specific location, e.g., the Space Needle, Pike Place market, Old Faithful, etc. Each edge represents a transition from one node (referred to as the origin) to another node (referred to as the destination). As will be discussed below, each edge is associated with data that indicates the likelihood (i.e., a probabilistic determination) of a user's transition from the edge's origin to its destination. Typically, but not exclusively, the transition graph 208 is stored/maintained by the transition service 120.

Figure 3:
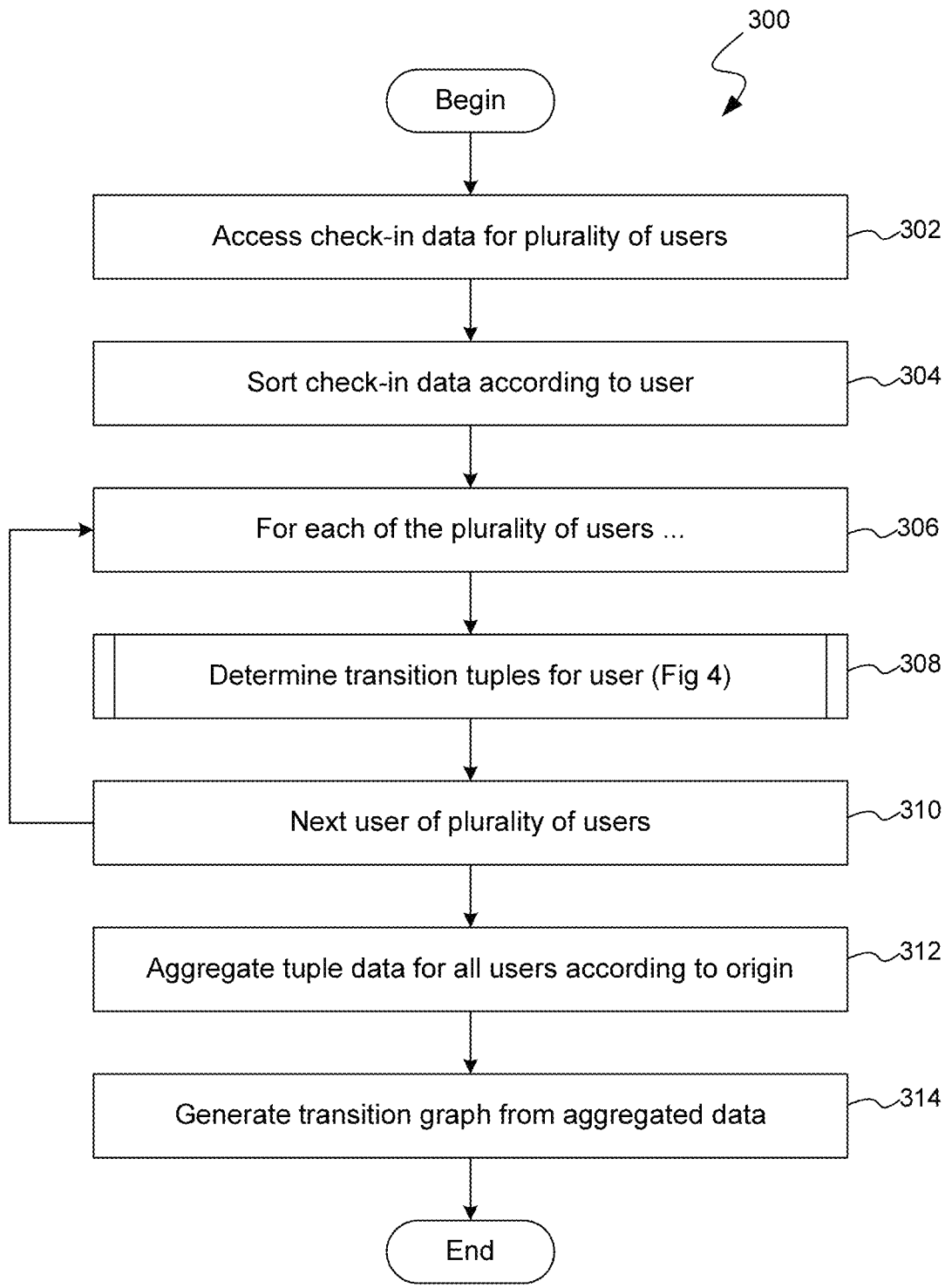
FIG. 3 is a flow diagram illustrating an exemplary routine for processing check-in data into a transition graph according to aspects of the disclosed subject matter.

Regarding the generation of the transition graph 208, FIG. 3 is a flow diagram illustrating an exemplary routine 300 for processing check-in data into a transition graph, according to aspects of the disclosed subject matter. While routine 300 is described in regard to execution by the transition service 120, it should be appreciated that this routine may be carried out on any suitable computing device. Beginning at block 302, the transition service 120 accesses check-in data 202 for a plurality of users. As indicated above, the check-in data may be gathered and maintained by the transition service 120, may be accessed from external services such as network services 110 and 112, or a combination of both internal check-in data (maintained by the transition service) as well as check-in data from external services.

At block 304, the check-in data is sorted according to user. As will be more evident below, the check-in data is sorted/organized according to user in order to identify transitions of each user from one location to another. At block 306, an iteration loop is begun to iterate through the check-in data for each of the plurality of users. Thus, for each of the plurality of users, at block 308 a set of transition tuples is determined for the currently iterated user. According to aspects of the disclosed subject matter, a transition tuple corresponds to a particular instance of a transition of the currently iterated user from an origin to a destination. To be included in the set of transition tuples for the currently iterated user, a transition tuple must meet certain, predetermined requirements. The determination of the currently iterated user's transition tuples, as well as a discussion of the predetermined requirements, is set forth below in regard to FIG. 4.

After determining the currently iterated user's set of transition tuples, at block 310 the routine 300 either returns to block 306 to process a next user's check-in data (as set forth above) or, when there are no additional sets of user check-in data to iterate through, the routine 300 proceeds to block 312. At block 312, the transition tuples for each of the plurality of users is aggregated according to origin. At block 314, the transition graph is generated from the aggregated data. According to one embodiment, the likelihood of a user transitioning from an origin to a destination is determined according to the percentage of transition tuples that begin at the given origin and transition to the destination in view of all of the transition tuples that begin at the given origin and transition to any destination. In other words, the likelihood of following an edge/transition from an origin to a destination is the percentage of all of the transitions that begin at that specific origin and transition to that destination. After generating the transition graph, the routine 300 terminates.

While check-in data and transition information (as determined by transition tuples), as well as other information that may be included with the check-in data, may be viewed as personal/private information, there are various measures that can be taken which allow the transition service 120 to generate a transition graph as well as maintain privacy of the various users. In one embodiment, while the check-in data is associated with a user, the identity of the user need not be disclosed. Moreover, in a large population of users, demographic data, preferences, etc., can be disclosed without actually disclosing the identity of the user. In maintaining privacy, a user identifier may be provided that uniquely differentiates the user from all other users without revealing the identity of the user. By way of an illustrative example, check-in data for "Mark Smith" may omit the actual identity of "Mark Smith" and simply associate a user identifier with the data: the user identifier being meaningless as to the identity of "Mark Smith" but sufficient to differentiate Mike Smith's check-in data from check-in data of other users. Of course, aggregating the transition tuples of all of the plurality of users will also provide anonymity to the users: i.e., the edges of the transition graph reflect the transitions of the entire population, not specific individuals.

According to additional aspects of the disclosed subject matter, even though the check-in data may be anonymized in some manner, as much data as possible regarding individual transitions should be maintained. Information regarding a transition may comprise data such as the time, date, day of week, whether the transition was made with friends, family, or acquaintances, the transition mode used in the transition, the amount of time that the user was at the origin, particular interests of the user, and the like. All of the available information associated with a transition tuple, without compromising privacy constraints, is optimally maintained with a transition tuple and aggregated in regard to the transition graph. As will be discussed in greater detail below, by maintaining as much information with regard to the transition tuples, improved probabilistic determinations of a transition from an origin to a destination may be made.

Figure 4:
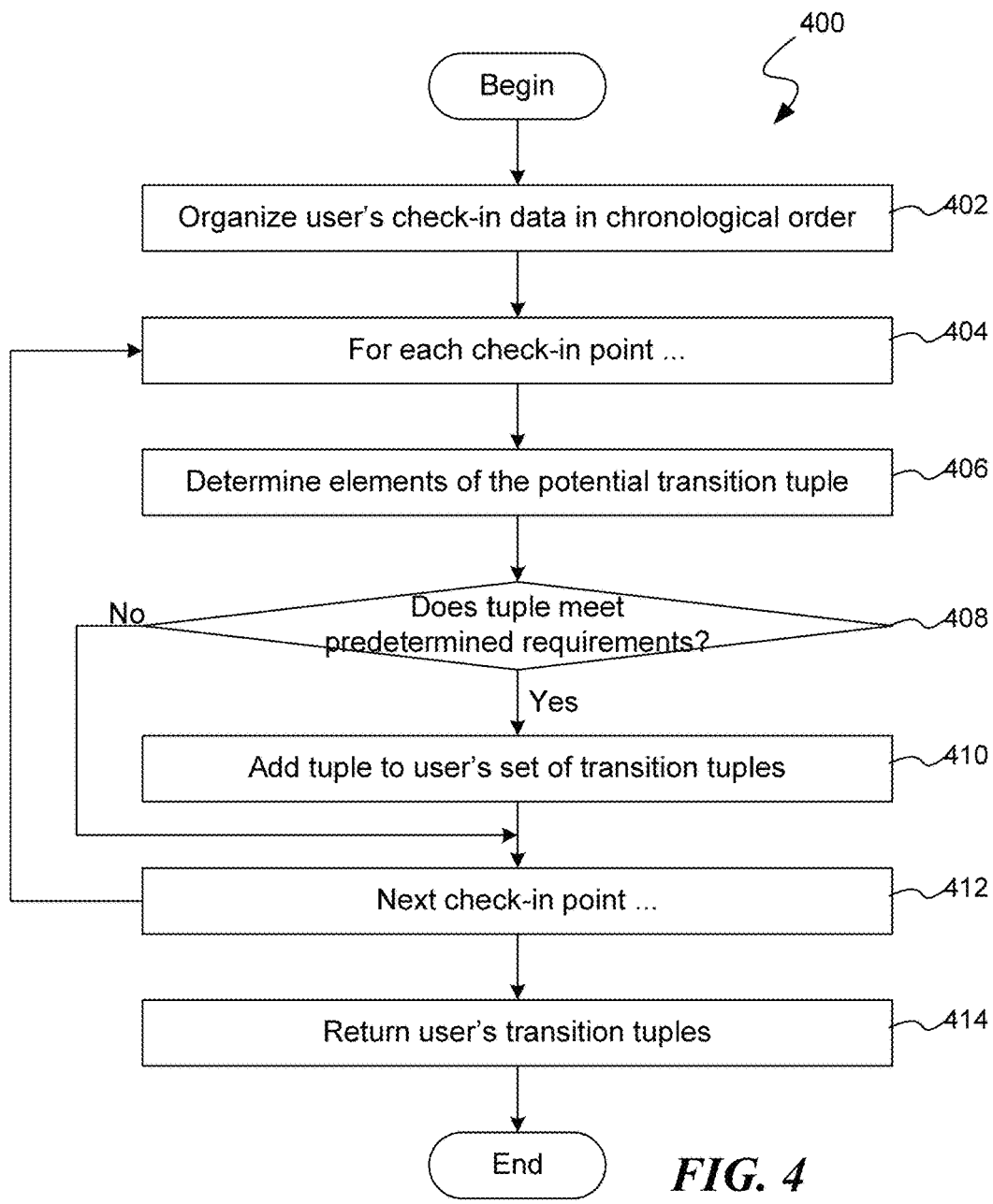
FIG. 4 is a flow diagram illustrating an exemplary subroutine, suitable for use in the routine of FIG. 3, in generating transition tuples for a user according to the user's check-in data.
Figure 5:
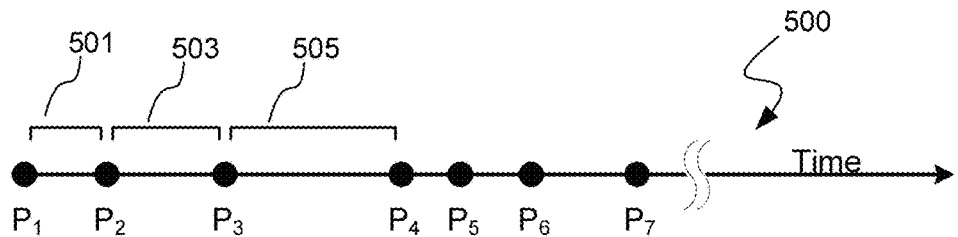
FIG. 5 is a pictorial diagram illustrating an exemplary chronological time line of a user's check-in data for illustrating the generation of transition tuples of a user.

Turning now to FIG. 4, FIG. 4 is a flow diagram illustrating an exemplary sub-routine 400 suitable for use in the routine of FIG. 3, particularly in regard to generating transition tuples for a user according to the user's check-in data. By way of example and for the purpose of illustration, reference is further made to FIG. 5, which discloses a pictorial diagram illustrating an exemplary chronological time line 500 of a user's check-in data, each point $P_1$-$P_7$ on the time line 500 represents a check-in for the associated user.

Beginning at block 402, the currently iterated user's check-in data is organized in chronological order. After sorting/organizing the check-in data in chronological order, at block 404 an iteration loop is begun to iterate through each check-in. For purposes of this iteration loop, the currently iterated check-in is viewed as the origin and the next check-in, according to chronological order, is viewed as the destination, thereby constituting a potential transition tuple. Hence, when evaluating/iterating to check-in $P_1$, $P_1$ constitutes the origin and $P_2$ constitutes the destination of a potential transition tuple 501 for the user. Similarly, when evaluating/iterating to check-in $P_2$, check-in $P_3$ becomes the destination defining the potential transition tuple 503.

At decision block 408, a determination is made as to whether the potential transition tuple meets certain predetermined requirements for including a potential transition tuple as one of the user's transition tuples. These criteria may be based on, by way of illustration and not limitation: the amount of time that transpires between the two check-in points, such that only if the difference in time falls within a predetermined threshold; whether the transition period spans over separate days; whether the check-ins (origin and destination) are within a particular geographic region; and the like. If the potential transition tuple fails to meet the predetermined requirements, the routine 400 does not include the potential transition tuple as part of the user's transition tuples and advances to block 412. However, if the potential transition tuple meets the predetermined requirements, at block 410 the potential transition tuple is included as one of the user's transition tuples. Thereafter, at block 412, if there are additional check-in points to process, the routine 400 returns to block 404 to repeat the process. Alternatively, once all of the check-in points are processed, at block 414 the routine returns the set of transition tuples for the user and the routine 400 terminates.

Advantageously, with a transition graph 208 generated, the graph may be leveraged to provide a predicted transition of a user from one place to another. Indeed, predicted transitions may be advantageously viewed as recommended transitions/destinations. For example, detecting that a user is currently at a particular theatre, an application, app, or service operating on the user's mobile device may leverage the information of a transition graph 208 to suggest that, typically, people that attend the particular theatre also go to a local restaurant after the show at the theatre is concluded. Moreover, in addition to recommending a "next" location, an entire itinerary of locations may be determined from the transition graph 208. For example, a user may query (e.g., through an application or service) the he is visiting the city of Seattle on a particular weekend and would like to visit local sites on the Saturday of that weekend. The service may begin with the user's hotel as an origin, as well as relevant information regarding the user and his preferences, to find a list of likely transitions (where the itinerary is composed of a series of transitions from one place to another).

Figure 6:
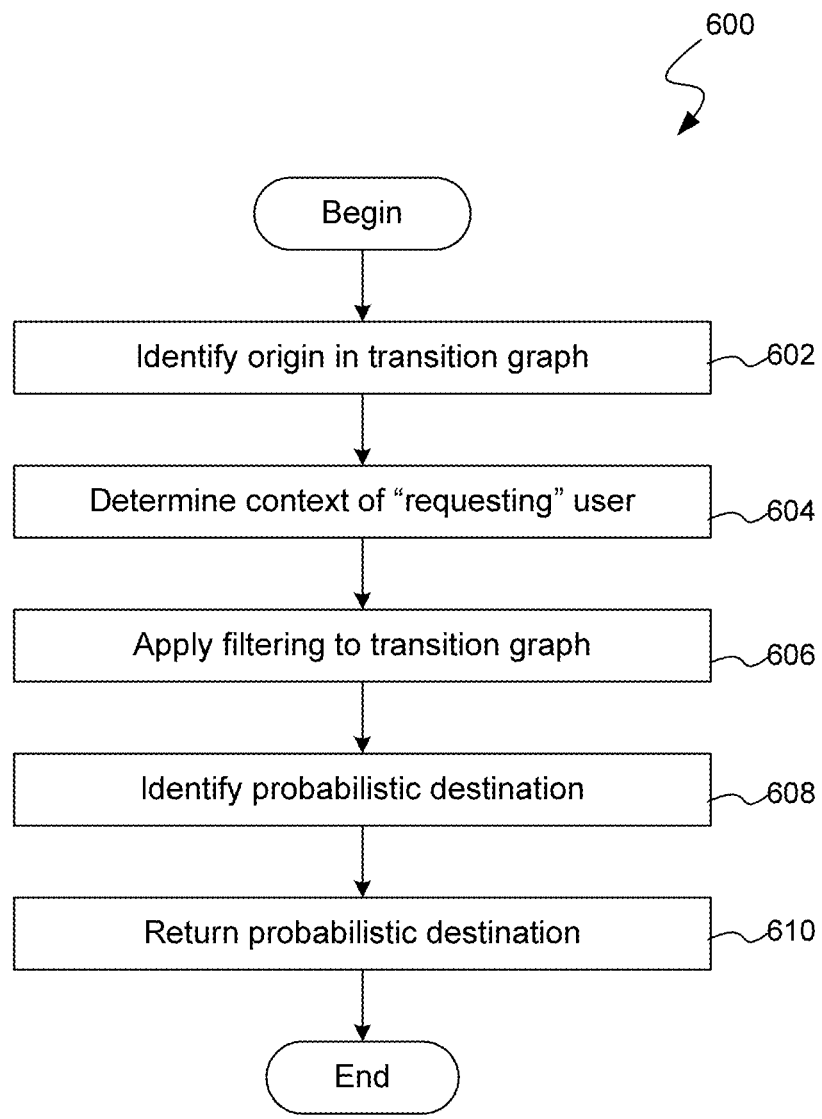
FIG. 6 is a flow diagram illustrating an exemplary routine for determining a probabilistic transition of a user from an origin to a destination according to aspects of the disclosed subject matter.

FIG. 6 is a flow diagram illustrating an exemplary routine 600 for determining a probabilistic transition of a user from an origin to a destination, according to aspects of the disclosed subject matter. Typically, this routine 600 may be executed by a transition service 120 in response to an itinerary or transition request. Beginning at block 602, the origin of a user is identified in a transition graph 208. The origin may be implied as the current location of the user, or may be a value passed to the routine, i.e., a statement that the origin will be a particular location. At block 604, contextual information regarding the "requesting" user (i.e., the user for which a probabilistic transition is requested) is determined. According to aspects of the disclosed subject matter, this contextual information may comprise information that is explicitly identified by the user as well as information that is obtained through implicit determinations. The contextual information may comprise, by way of illustration and not limitation: the amount of time that is available to the user for a transition from the origin to a destination; the mode of transportation of the user; whether the user will be with others, such as friends, children, etc.; personal interests (e.g., the user prefers to view museums, aquariums, local interests, golf, etc.); and the like.

At block 606, filtering may be applied to the transition graph 208. Filtering corresponds to constraints or rules that are applied in determining a transition from the current location (the origin) to another location. Filtering, at least temporarily, removes transition data from the transition graph (or at least from consideration) that do not satisfy the filtering criteria. Filters may include locations/destinations that have already been visited (which could be previous entries of an itinerary); a limit on the distance the user is willing to travel from the current location; the amount of time that the user has available; whether a destination is handicap accessible; whether a destination is kid-friendly; and the like. While filters are often restrictive in nature, i.e., limiting the potential destinations from the current location/ origin, according to aspects of the disclosed subject matter, filters may also act as a weighting factor to enhance one or more destinations over another. For example, if a personal preference is to visit art museums over more popular venues even though popular venues may be ok, the filtering may act as weighting factor to enhance one destination over another. After applying the filtering, at block 608 a probabilistic destination is determined. This probabilistic determination is made as a function of the aggregate likelihood of all users transitioning to a destination in view of the particular filtering of the user. In one embodiment, the transition from the origin to a destination corresponding to the highest likelihood of transition is selected as the probabilistic destination.

Figure 7A:
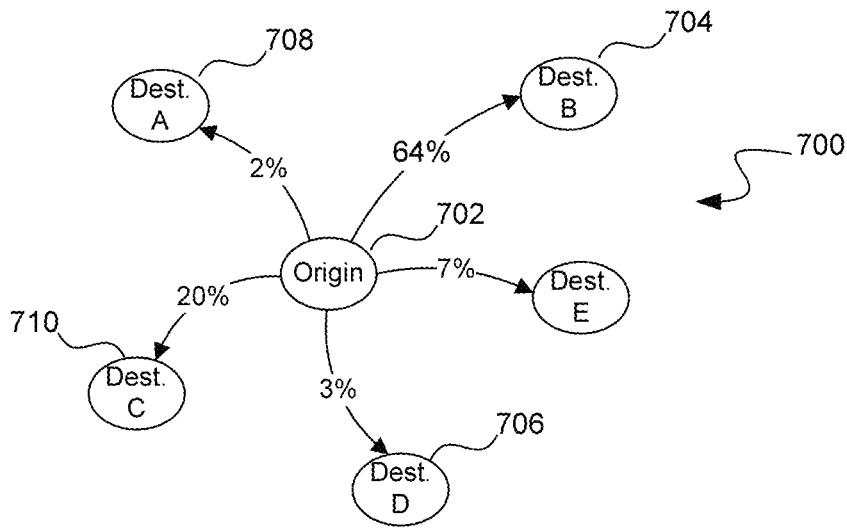
FIGS. 7A and 7B illustrate exemplary transition graphs generated according to aspects of the disclosed subject matter.
Figure 7B:
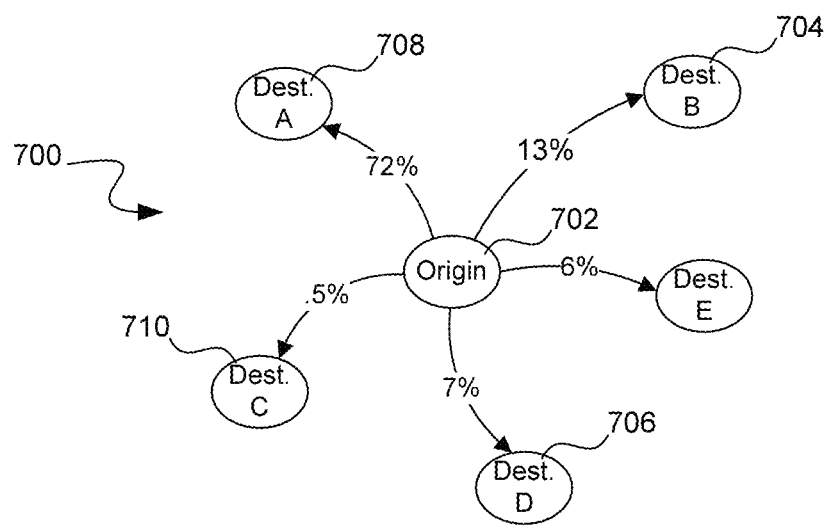

Regarding this probabilistic determination, FIGS. 7A and 7B are pictorial diagrams illustrating exemplary transition graphs generated according to aspects of the disclosed subject matter, and for further describing the determination of a probabilistic destination. With reference to FIG. 7A, assume that the illustrated transition graph 700 represents transitions (edges) from a user's current location/origin 702 to various destinations, represented by nodes 704-710. For illustration purposes, each edge displays the probability from transitioning from the origin 702 to the corresponding destination according to the aggregated transition data discussed above. As can be seen, the aggregated transition information (without applying any filtering) suggests that the most likely transition for the user from the origin 704 is to "Dest. B", as represented by node 704. However, as shown in FIG. 7B, which illustrates the transition graph 700 after filtering has been applied, the most likely transition for the user to another destination is to "Dest. A", as represented by node 708. As suggested above, this "change" in the likelihood values from FIG. 7A to FIG. 7B is based on the particular filtering/constraints provided with regard to the user. For example, the user may indicate that wherever the destination, he wants to ride his bicycle to the location and, when applying such filtering to the transition graph 700 (as shown in FIG. 7B), there is a 72% likelihood of transitioning from the origin to "Dest. A", represented by node 708.

After identifying the probabilistic destination, the routine 600 terminates.

It should be appreciated that while some of the information used for filtering may be included with the check-in data gathered by the various network sites, the transition service 120 (or other service) that implements the routine 600 for identifying a probabilistic destination from an origin may use additional information from other internal and external sources. These other sources may include meta-data regarding various locations (potential destinations) that can be used to determine the suitability of a potential transition to a destination based on the rules and/or criteria provided to the routine 600.

Regarding the routines described above (in FIGS. 3, 4 and 6), as well as other processes describe herein, while these routines/processes are expressed in regard to discrete steps, these steps should be viewed as being logical in nature and may or may not correspond to any actual and/or discrete steps of a particular implementation. The order in which these steps are presented in the various routines and processes should not be construed as the only order in which the steps may be carried out. Moreover, while these routines include various novel features of the disclosed subject matter, other steps (not listed) may also be carried out in the execution of the routines. Those skilled in the art will appreciate that logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on computing devices, such as the device described below in regard to FIG. 8. In various embodiments, all or some of the various routines may also be embodied in hardware modules, including but not limited to system on chips, specially designed processors and or logic circuits, and the like on a computer system.

These routines/processes are typically implemented in executable code comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the link. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions that are stored on the computer-readable storage devices are executed, they carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 8:
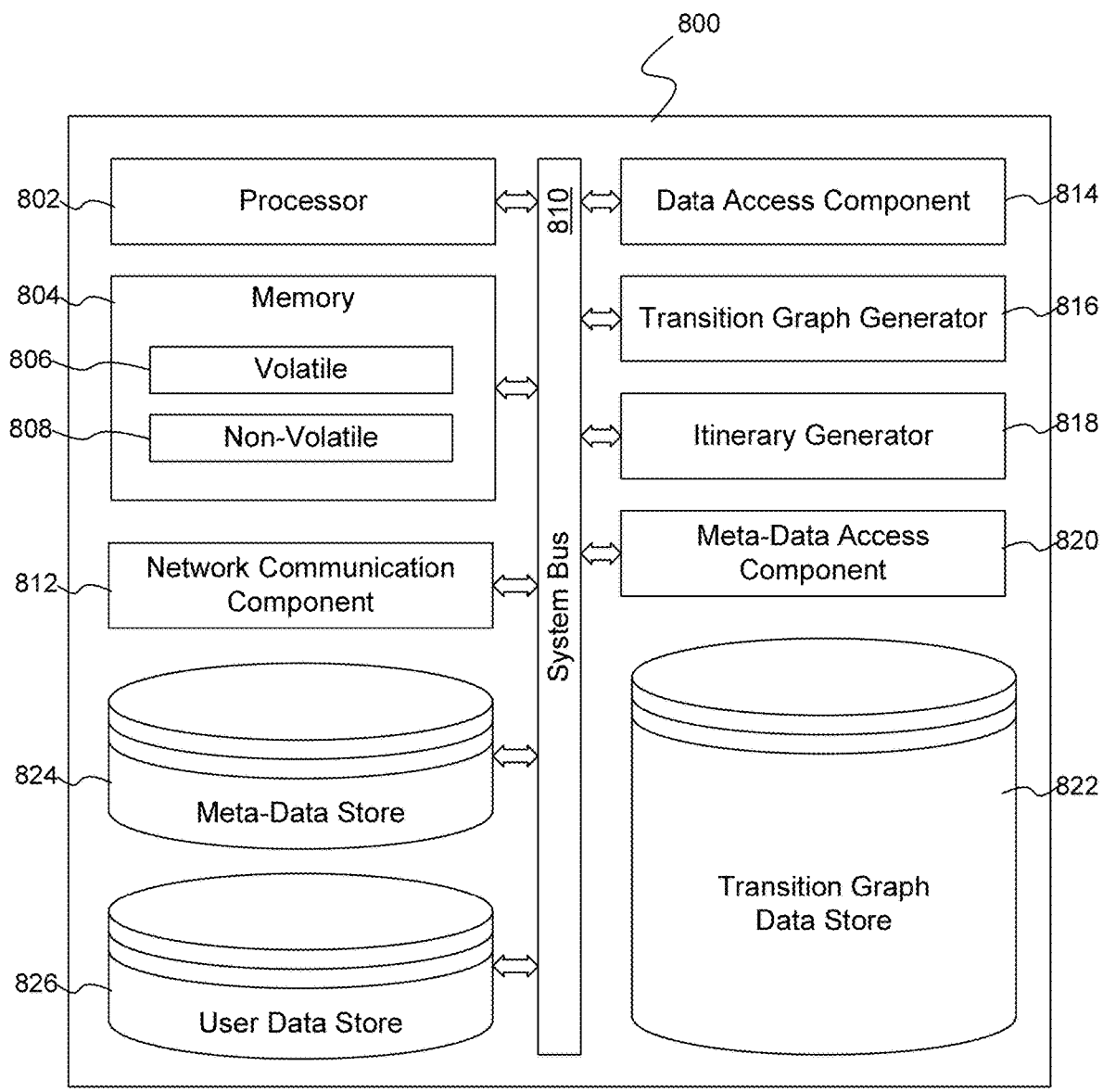
FIG. 8 is a block diagram illustrating exemplary components of a computer system suitable for generating a transition graph of check-in data from a plurality of users according to aspects of the disclosed subject matter.

Turning now to FIG. 8, this figure is a block diagram illustrating exemplary components of a computer system 800 suitable for generating and manipulating a transition graph 208 of check-in data from a plurality of users according to aspects of the disclosed subject matter. The exemplary computing system 800 includes a processor 802 (or processing unit) and a memory 804 interconnected by way of a system bus 810. As will be readily appreciated, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

The processor 802 executes instructions retrieved from the memory 804 in carrying out various functions, particularly in regard to generating and manipulating a transition graph 208 as described above. The processor 802 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: personal digital assistants, wearable computing devices, smart phone devices, tablet computing devices, phablet computing devices, laptop computers, desktop computers, and the like.

The system bus 810 provides an interface for the various components of the mobile device to inter-communicate. The system bus 810 can be of any of several types of bus structures that can interconnect the various components (including both internal and external components). The exemplary computing system 800 further includes a network communication component 812 for interconnecting the computing system 800 with other network accessible computers, online services, and/or network entities as well as other devices on the computer network 108. The network communication component 812 may be configured to communicate with the various computers and devices over the network 108 via a wired connection, a wireless connection, or both.

Also included in the computing system 800 is a data access component 814. The data access component 814 is configured to access check-in data from one or more external network sources, such as network sources 110-112. The data access component 814 is further configured to access any check-data that is maintained by the computer system 800, such as may be found in user data store 826. Per the processed described above, the data access component 814 provides the check-in information to the transition graph generator 816 for processing into the transition graph 208. According to one non-limiting embodiment, the transition graph 208 is stored/maintained in the transition graph data store 822 of the computing system 800.

The computing system 800 also includes an itinerary generator 818 that is configured to provide a probabilistic destination for a given origin for a user, as described above. As mentioned above, the itinerary generator 818 may access meta-data regarding various destinations in determining a probabilistic transition from an origin to a destination. This meta-data may be locally stored in a meta-data store 824, accessed remotely via a meta-data access component 820, or a combination of the two. Of course, while itinerary generator 818 may provide a probabilistic transition from an origin to a destination as described above in regard to routine 600, the itinerary generator may be further configured to provide an entire itinerary for a user.

Regarding the various components of the exemplary computing system 800, those skilled in the art will appreciate that these components may be implemented as executable software modules stored in the memory of the computing device, as hardware modules (including SoCs—system on a chip), or a combination of the two. Moreover, each of the various components may be implemented as an independent, cooperative process or device, operating in conjunction with or on one or more computer systems. It should be further appreciated, of course, that the various components described above in regard to the exemplary computing system 800 should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

According to aspects of the disclosed subject matter, the transition graph 208 may be the basis for generating entire itineraries for people. More particularly, through the use of clustering techniques and data mining, a series of transitions can be compiled which, together, for an itinerary. For example, for a person that is new to the San Francisco area and planning on visiting, an originating position may be provided and a series of probabilistic transitions, beginning from the origin (San Francisco) to various locations throughout the area can be determined. Similarly, the person could provide various criteria regarding the particular visit, e.g., the dates of the person's visit, the amount of time that is available for visiting attractions and when this time occurs, preferences as to which location the person would prefer to visit, whether or not the person is traveling with others/kids, and the like. Without more specific criteria, in response to a request from a user, several probabilistic itineraries may be presented. Alternatively, a probabilistic itinerary with conditional branches based on a person's intermediate selection (as to an entire itinerary) may be presented.

Figure 9:
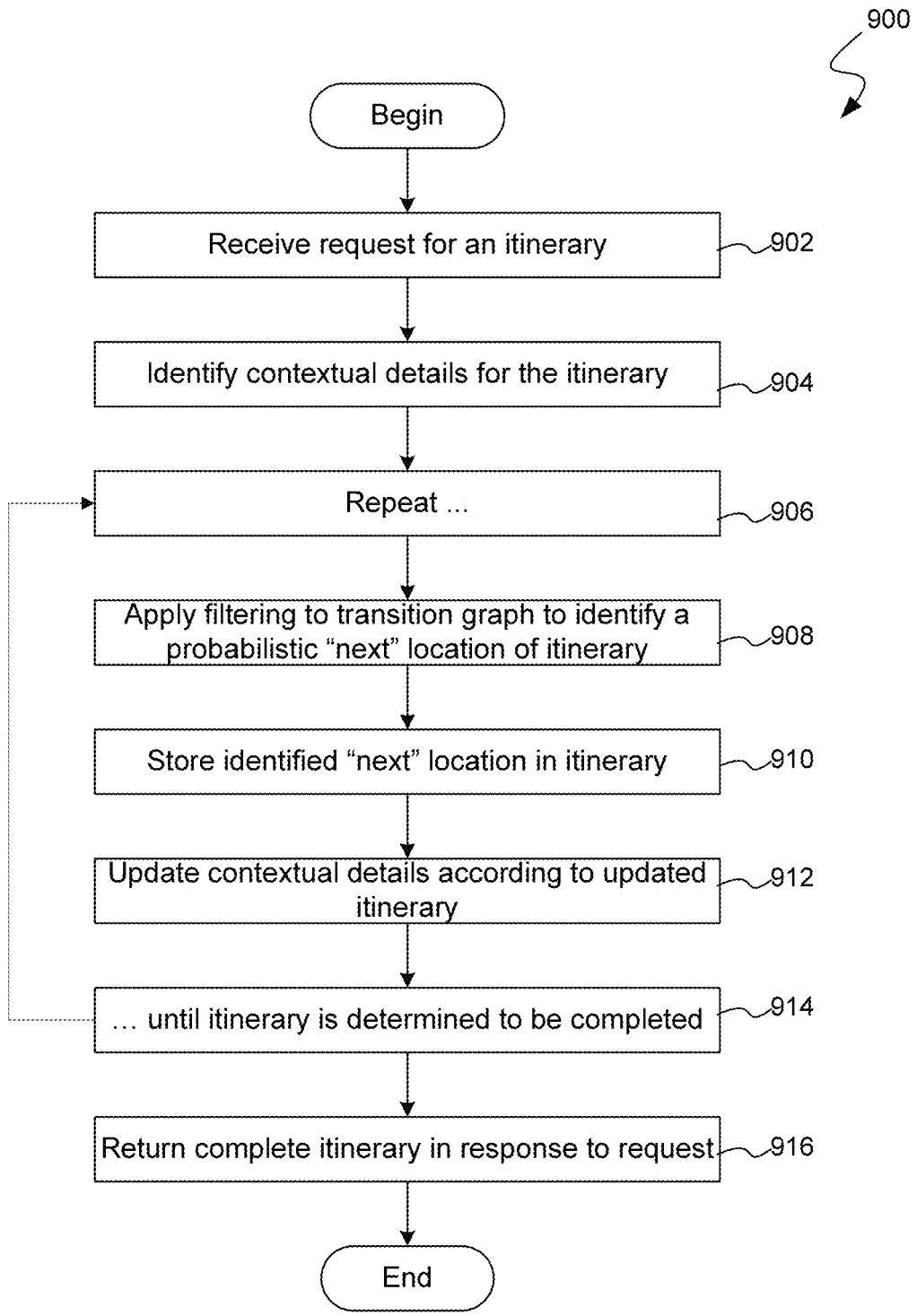
FIG. 9 is a flow diagram of an exemplary routine suitable for determining a probabilistic itinerary from a transition graph in response to an itinerary request.

Regarding generating completed itineraries, FIG. 9 is a flow diagram of an exemplary routine 900 suitable for determining a probabilistic itinerary from a transition graph in response to an itinerary request. According to various embodiments, the routine 900 may be implemented as an online service such that a user may specifically request an itinerary from the service, or may be called in regard to receiving a request for information regarding a person's travel to a new location. For example, upon receiving a request for information regarding potential attractions that a person might see when visiting an area, a search engine may, on behalf of the requesting user, execute the routine 900 (or obtain the information from a service that implements the routine) on behalf of the user to include with the search results.

Beginning at block 902, a request for an itinerary is received. At block 904, contextual details/information regarding the requested itinerary are determined. This information may include, by way of illustration and not limitation, the location/origin of the itinerary, the date of arriving at the location, the length of stay at the location, and the like. In addition to the information regarding the origin, contextual information regarding the requesting user is also identified. This contextual information may further include, again by way of illustration and not limitation, whether the requesting user is alone or with others, what does the user already have planned, whether or not the user has visited one or more of the attractions in the area, personal preferences and interests of the user, transportation options of the user, and the like. All of this information is organized such that information that may be applicable in filtering the transition graph are identified.

At block 906 a repeating loop is begun to iteratively generate an itinerary for the user (with the itinerary beginning at the origin). Thus, at block 908, the identified contextual information is applied to the transition graph 208 and a "next" location of the itinerary is identified (according to the processes described above.) At block 910, the itinerary is updated with this "next" location. At block 912, the contextual details for filtering the transition graph 208 are updated. This update is important as it identifies the "current" location from which a transition is determined as well as identifying what is already visited such that the itinerary does not loop back to that location (unless there are conditions where such looping back is a valid option in the itinerary.)

After processing an element/transition of the itinerary, at block 914 the routine 900 either returns to block 906 to continue generating the itinerary or, if the itinerary is determined to be complete, the routine proceeds to block 916. Determining whether an itinerary is complete may be a function of the amount of time that is available to visit the locations of the itinerary, a function of how many elements is typically included in an itinerary, and the like. At block 916, the completed itinerary is returned to the requesting user (or to the requesting service). Thereafter, the routine 900 terminates.

While routine 900 describes generating a single itinerary based on certain criteria, it should be noted that the routine may be repeatedly used to generate multiple, distinct itineraries based on varying criteria. For example, when a user requests information regarding visitor sites in a location to which the user will be traveling, a search engine may or may not know whether the user will be traveling with others, how many days the user may be available, and the like. Thus, rather than generating a single itinerary for the user, multiple itineraries based on varying criteria may be generated and returned with the search results of the search query. Criteria such as "walking," "art and museums," "popular events," "scenic travel by car," "historical sites," and the like may be varied to generate a variety of itineraries. Of course, by way of a user interface to an online service (such as described above) user may selectively vary specific elements to generate multiple itineraries base on probabilistic transitions. Controls that vary criteria group such as themes (arts and museums, popular tourist sites, scenic, historic, etc.), travel characteristics (walking, public transportation, cycling, motorcycling, car, etc.), and overall time (hours, days, weekends only, evenings only, etc.) may be selectively manipulated by a user to generate one or more itineraries for a given origin.

Figure 10:
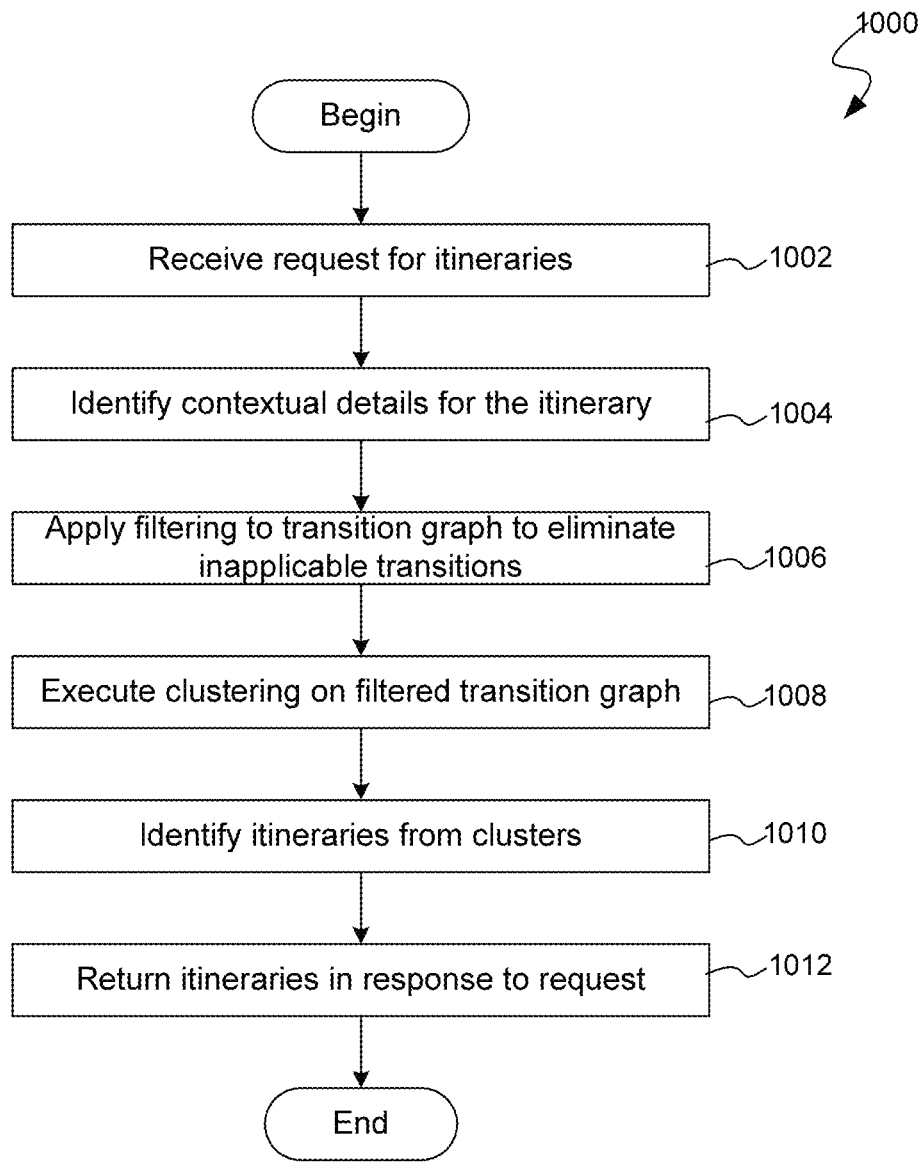
FIG. 10 is a flow diagram of an alternative exemplary routine suitable for determining one or more probabilistic itineraries from a transition graph in response to an itinerary request.
Figure 11A:
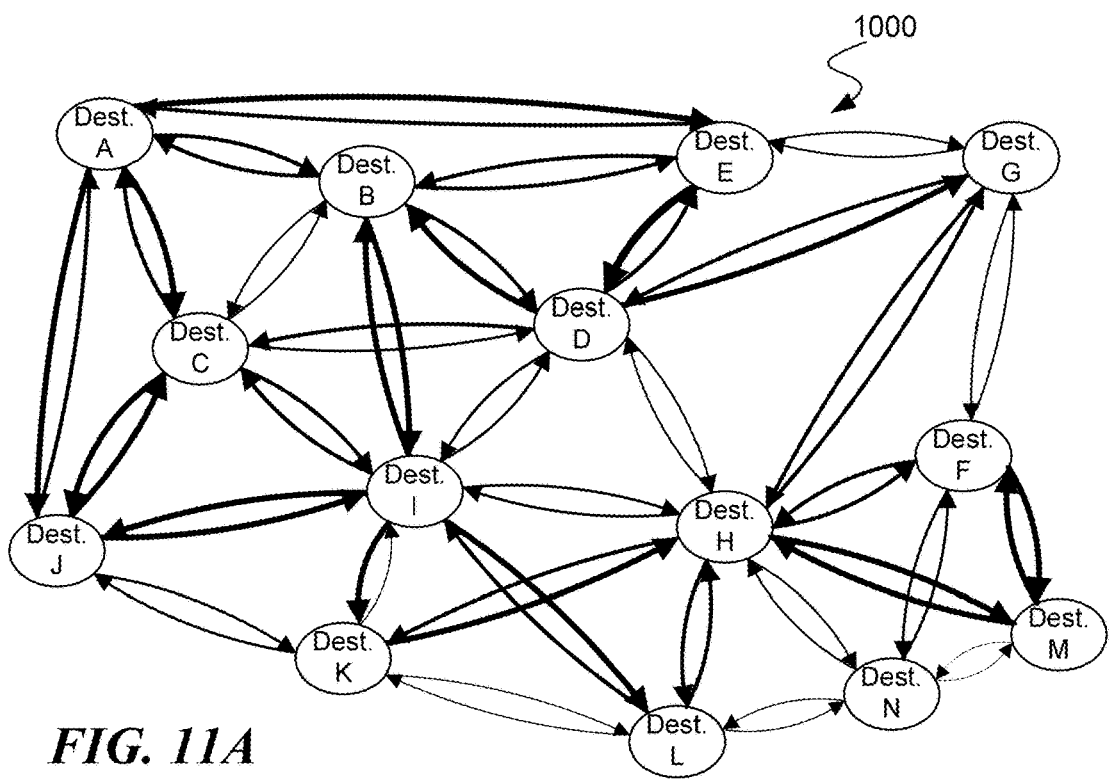
FIGS. 11A-11C are pictorial diagrams illustrating an exemplary transition graph suitable for illustrating the results of routine in determining one or more probabilistic itineraries from a transition graph.
Figure 11B:
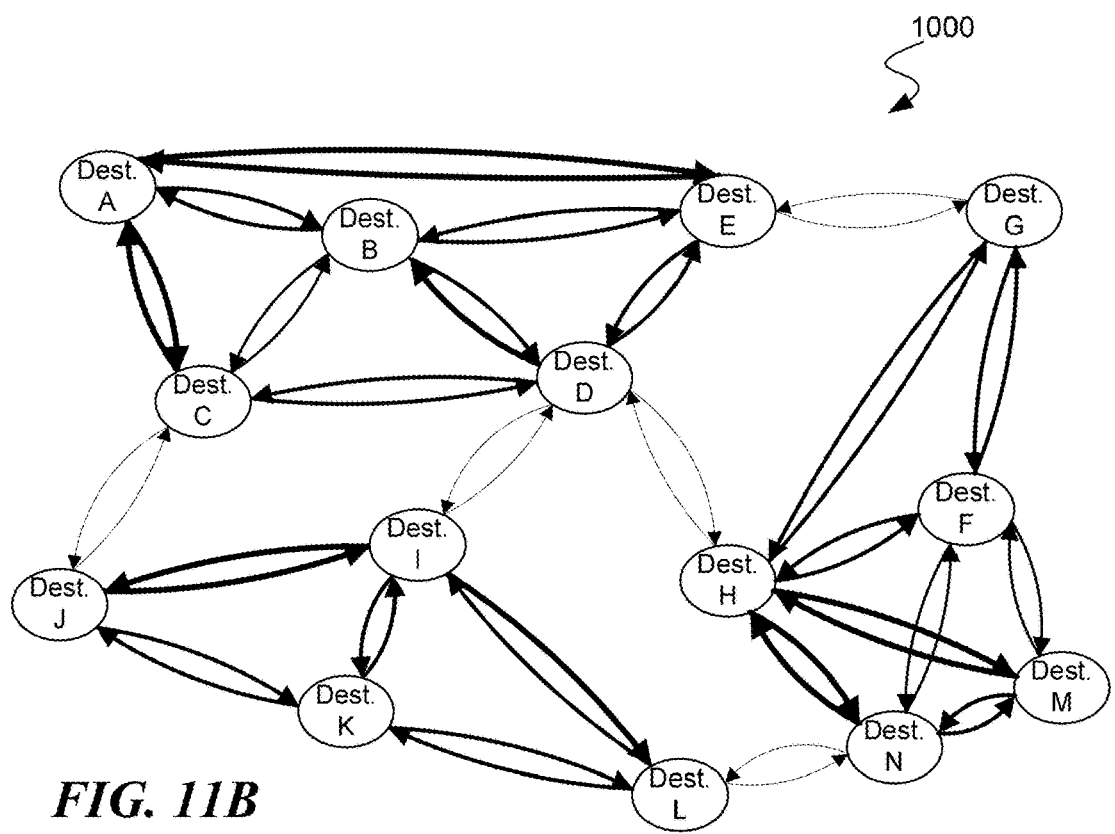
Figure 11C:
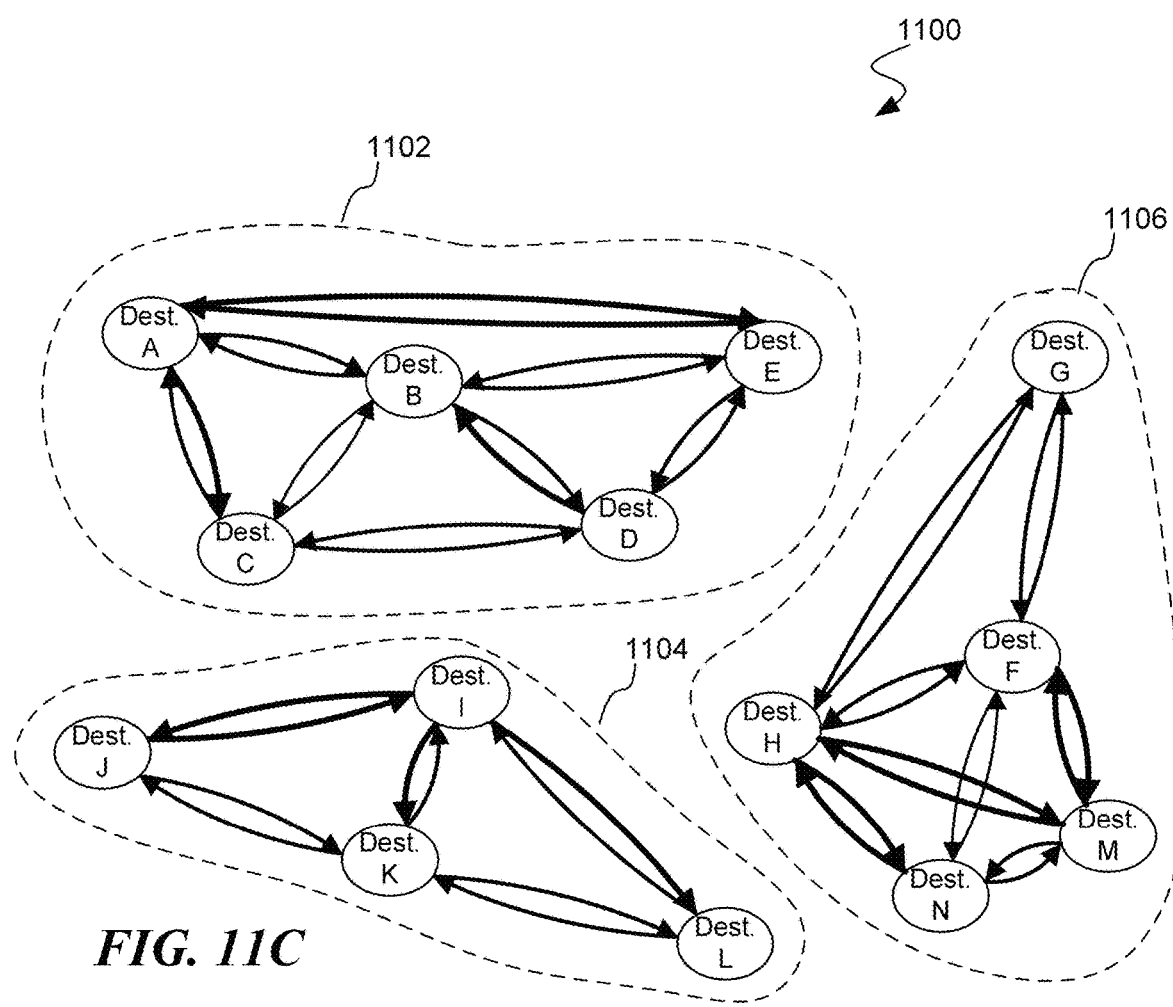

In contrast to the iterative process of generating an itinerary as set forth in regard to FIG. 9, an alternative approach may be to use filtering and clustering techniques to generate one or more itineraries. FIG. 10 is a flow diagram illustrating an exemplary routine 1000 suitable for determining one or more probabilistic itineraries from a transition graph in response to an itinerary request. Further, FIGS. 11A-11C are pictorial diagrams illustrating an exemplary transition graph 1100 suitable for illustrating the results of routine 1000 in determining one or more probabilistic itineraries from a transition graph.

Beginning at block 1002, a request for one or more probabilistic itineraries is received. At block 1004, contextual details/information regarding the requested itinerary are determined. As indicated above in regard to routine 900, this information may include the location/origin of the itinerary, the date of arriving at the location, the length of stay at the location, and the like. In addition to the information regarding the origin, contextual information regarding the requesting user is also identified. This contextual information may further include, again by way of illustration and not limitation, whether the requesting user is alone or with others, what does the user already have planned, whether or not the user has visited one or more of the attractions in the area, personal preferences and interests of the user, transportation options of the user, and the like.

At block 1006, the filtering is applied to the transition graph (or a portion of the transition graph relating to the general area in which the itineraries are sought.) As discussed above, the result of applying the filtering to the transition graph is to filter out those transitions that are inapplicable given the current contextual information. For example and with regard to the transition graph 1100 of FIGS. 11A-11C, the transition graph of FIG. 11A may be viewed as the unfiltered transition graph for an exemplary area, comprising location nodes Dest. A-Dest. N and having transitions (edges) between the nodes. Rather than illustrate numerous individual transitions between the location nodes, for illustration purposes a weighted edge is used, such that a heavier edge indicates more transitions along the edge between and origin location node and a destination location node. Thus, by way of illustration, in FIG. 11A the number of transitions from node Dest. E to Dest. D is greater than the transition from Dest. D to Dest. E (as indicated by the weight of the transition edges.) After applying the filtering (in block 1006), the resulting transition graph 1100 may appear as set forth in FIG. 11B. As can be seen, the resulting probabilities of transitioning between location nodes in the transition graph 1100 may change, as indicated by the changes to the weighting of transition edges between location nodes.

Returning again to FIG. 10, after applying the filtering to the transition graph, at block 1008 a clustering algorithm may be applied to the resulting transition graph. Clustering algorithms are known in the art and, as will be appreciated, group elements (in this case nodes of a graph) into one or more clusters. One result of clustering the resulting transition graph is that it "breaks" weaker transitions between location nodes. For example, while in FIG. 11B there are transitions between location nodes Dest. D and Dest. I, and between Dest. L and Dest. N. However, as shown in the transition graph 1100 of FIG. 11C, the result of clustering proved that those transitions are not of significant value such that the nodes are separated into distinct clusters, comprising clusters 1102-1106. Hence, at block 1010, one or more itineraries are identified from the resulting clusters. In regard to the example of FIGS. 11A-11C, the result is 3 itineraries corresponding to clusters 1102-1106. According to one embodiment, if the order of transitions between nodes of a cluster is important to the itinerary, the transition weights among the clusters may be used as a basis for providing such order. Thereafter, at block 1012, the itineraries are returned and the routine 1000 terminates.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for generating a transition graph for determining probabilistic transitions, the method comprising each of the following as executed by a processor on a computing device:
   obtaining check in data of a plurality of users, wherein each item of check in data indicates the physical presence of a corresponding user at a physical location;
   sorting the check in data according to the corresponding users;
   generating a set of transition tuples for each of the plurality of users according to the sorted check in data;

aggregating the transition tuples of the plurality of users according to the origin of the transition tuples; and generating a transition graph according to the aggregated transition tuples, wherein the transition graph comprises a plurality of nodes and edges, each node corresponding to a physical location, and each edge indicating a transition from an origin node to a destination node and associated with a likelihood of a user transitioning from the origin node to the destination node, wherein each likelihood is determined according to a percentage of all the transitions of the plurality of users from the corresponding origin node to the corresponding destination node.

2. The computer implemented method of claim 1, wherein each item of check in data includes a user identifier of the corresponding user.

3. The computer implemented method of claim 2, wherein the user identifier differentiates the corresponding user from all other users without disclosing the identity of the corresponding user.

4. The computer implemented method of claim 3, wherein each item of check in data further indicates a date and time of the check in of the corresponding user at the location.

5. The computer implemented method of claim 1, wherein each transition tuple comprises information indicating an origin and a destination, indicative of a transition from the origin to the destination by the corresponding user.

6. The computer implemented method of claim 5, wherein generating a set of transition tuples for each of the plurality of users comprises, for each of the plurality of users:
chronologically ordering the check in data corresponding to a user;
iteratively pairing a first check in point with an immediately subsequent check in point, as chronologically ordered, as a potential transition tuple, wherein the first check in point is the origin of the potential transition tuple and the immediately subsequent check in point is the destination of the potential transition tuple;
for each potential transition tuple, determining whether the potential transition tuple meets predetermined requirements; and
retaining those potential transition tuples that meet the predetermined requirements in the set of transition tuples for the corresponding user.

7. The computer implemented method of claim 6, wherein determining whether the potential transition tuple meets predetermined requirements comprises determining whether the time between the check in at the origin and the check in at the destination is within a predetermined amount of time.

8. The computer implemented method of claim 7, wherein determining whether the potential transition tuple meets predetermined requirements further comprises determining whether the distance between the origin and the destination is within a predetermined distance.

9. The computer implemented method of claim 7, wherein determining whether the potential transition tuple meets predetermined requirements further comprises determining whether the origin and the destination are within the same geographic region.

10. A computer readable medium bearing computer executable instructions which, when executed on a computing system comprising at least a processor retrieved from the medium, carries out a method for generating a transition graph for determining probabilistic transitions, the method comprising:

obtaining check in data of a plurality users, wherein each item of check in data indicates the physical presence of a corresponding user at a physical location;

generating a set of transition tuples for each of the plurality of users according to the obtained check in data;

aggregating the transition tuples of the plurality of users according to the origin of the transition tuples;

generating a transition graph according to the aggregated transition tuples, wherein the transition graph comprises a plurality of nodes and edges, each node corresponding to a physical location and each edge indicating a transition from an origin node to a destination node and associated with a likelihood of a user transitioning from the origin node to the destination node, wherein each likelihood is determined according to a percentage of all the transitions of the plurality of users from the corresponding origin node to the corresponding destination node;

receiving a request for a probabilistic transition for a user from an origin;

determining a plurality of likely transitions for the user from the origin to a destination; and returning the plurality of likely transition to the user in response to the request.

11. The computer readable medium of claim 10, wherein each transition tuple comprises information indicating an origin and a destination, and indicative of a transition from the origin to the destination by the corresponding user.

12. The computer readable medium of claim 11, wherein generating a set of transition tuples for each of the plurality of users comprises, for each of the plurality of users:
chronologically ordering the check in data corresponding to a user;
iteratively pairing a first check in point with an immediately subsequent check in point, as chronologically ordered, as a potential transition tuple, wherein the first check in point is the origin of the potential transition tuple and the immediately subsequent check in point is the destination of the potential transition tuple;
for each potential transition tuple, determining whether the potential transition tuple meets predetermined requirements; and
retaining those potential transition tuples that meet the predetermined requirements in the set of transition tuples for the corresponding user.

13. The computer readable medium of claim 12, wherein determining whether the potential transition tuple meets predetermined requirements comprises determining whether the time between the check in at the origin and the check in at the destination is within a predetermined amount of time.

14. The computer readable medium of claim 10, wherein determining the likelihood of the user transitioning from the origin to a destination comprises:
applying a filtering to the transition graph based on the current context of the user; and
identifying a destination having the highest possibility of transition from the origin as the likelihood.

15. The computer readable medium of claim 10, wherein each item of check in data indicates a date and time of the check in of the corresponding user at the location, and further includes a user identifier of the corresponding user.

16. A computer system for generating a transition graph for determining probabilistic transitions, the computer system comprising a processor and a memory, wherein the processor executes instructions stored in the memory as part of or in conjunction with additional components, the additional components comprising:
  a data access component configured to access check in data for a plurality of users, wherein each item of check in data indicates the physical presence of a corresponding user at a physical location; and
  a transition graph generator configured to:
    generate a set of transition tuples for each of the plurality of users according to the accessed check in data;
    aggregate the transition tuples of the plurality of users according to the origin of each of the transition tuples; and
    generate a transition graph according to the aggregated transition tuples, wherein the transition graph comprises a plurality of nodes and edges, each node corresponding to a physical location and each edge indicating a transition from an origin node to a destination node and associated with a likelihood of a user transitioning from the origin node to the destination node, wherein each likelihood is determined according to a percentage of all the transitions of the plurality of users from the corresponding origin node to the corresponding destination node;
    receive a request for an itinerary from a computer user;
    determine contextual information of the computer user including an origin;
    identify a plurality of probabilistic itineraries for the computer user from the original according to the contextual information according to the transition graph; and
    respond to the request with the plurality of probabilistic itineraries to the computer user.

17. The computer system of claim 16, wherein the transition graph generator is further configured to generate the set of transition tuples by:
  chronologically ordering the check in data corresponding to a user;
  iteratively pairing a first check in point with an immediately subsequent check in point, as chronologically ordered, as a potential transition tuple, wherein the first check in point is the origin of the potential transition tuple and the immediately subsequent check in point is the destination of the potential transition tuple;
  for each potential transition tuple, determining whether the potential transition tuple meets predetermined requirements; and
  retaining those potential transition tuples that meet the predetermined requirements in the set of transition tuples for the corresponding user.

18. The computer system of claim 17 further comprising an itinerary generator configured to determine the likelihood of a user transitioning from the origin node to the destination node, and return the transition to the user in response to a request on behalf of the user.

19. The computer system of claim 18, wherein each item of check in data includes a user identifier of a corresponding user, wherein the user identifier differentiates the corresponding user from all other users without disclosing the identity of the corresponding user.

* * * * *